United States Patent
Boussand et al.

(10) Patent No.: US 11,920,837 B2
(45) Date of Patent: Mar. 5, 2024

(54) CONTAINER FOR STORING A COMPOSITION COMPRISING TETRAFLUOROPROPENE AND METHOD FOR STORING SAME

(71) Applicant: Arkema France, Colombes (FR)

(72) Inventors: Béatrice Boussand, Sainte Foy les Lyon (FR); Wissam Rached, Chaponost (FR); Laurent Wendlinger, Soucieu en Jarrest (FR)

(73) Assignee: Arkema France, Colombes (FR)

( * ) Notice: Subject to any disclaimer, the term of this patent is extended or adjusted under 35 U.S.C. 154(b) by 374 days.

(21) Appl. No.: 16/083,139

(22) PCT Filed: Mar. 17, 2017

(86) PCT No.: PCT/FR2017/050617
§ 371 (c)(1),
(2) Date: Sep. 7, 2018

(87) PCT Pub. No.: WO2017/162961
PCT Pub. Date: Sep. 28, 2017

(65) Prior Publication Data
US 2019/0086132 A1     Mar. 21, 2019

(30) Foreign Application Priority Data

Mar. 22, 2016 (FR) ...................... 1652436

(51) Int. Cl.
*F25B 45/00* (2006.01)
*C09K 5/04* (2006.01)
*F17C 1/00* (2006.01)

(52) U.S. Cl.
CPC .............. *F25B 45/00* (2013.01); *C09K 5/045* (2013.01); *F17C 1/00* (2013.01); *C09K 2205/126* (2013.01); *C09K 2205/24* (2013.01); *F17C 2201/0104* (2013.01); *F17C 2201/052* (2013.01); *F17C 2201/054* (2013.01); *F17C 2201/056* (2013.01); *F17C 2203/0607* (2013.01); *F17C 2203/0619* (2013.01); *F17C 2203/0634* (2013.01); *F17C 2203/0639* (2013.01); *F17C 2203/0648* (2013.01); *F17C 2205/0107* (2013.01); *F17C 2221/038* (2013.01); *F17C 2260/056* (2013.01); *F25B 2345/001* (2013.01)

(58) Field of Classification Search
CPC .... F25B 45/00; F25B 2345/001; C09K 5/045; C09K 2205/126; C09K 2205/24; F17C 1/00; F17C 2203/0634; F17C 2260/056; F17C 2201/0104; F17C 2201/052; F17C 2201/054; F17C 2201/056; F17C 2203/0607; F17C 2203/0619; F17C 2203/0639; F17C 2203/0648; F17C 2205/0107; F17C 2221/038; B65D 88/02
USPC ...................... 428/485, 522, 98; 252/67, 68; 427/427.7, 485, 372.2; 53/474
See application file for complete search history.

(56) References Cited

U.S. PATENT DOCUMENTS

| | | | |
|---|---|---|---|
| 2012/0021247 A1* | 1/2012 | Komatsu | F25B 49/005 428/646 |
| 2013/0219953 A1* | 8/2013 | Herbert | F28D 1/053 62/509 |
| 2015/0051426 A1* | 2/2015 | Fukushima | C07C 21/18 570/136 |

FOREIGN PATENT DOCUMENTS

EP     2413066 A1     2/2012

OTHER PUBLICATIONS

Solstice yf Refrigerant User Guide published by Honeywell, Mar. 2014 (Year: 2014).*
British Standard—Flat products made of steels for pressure purpose, BS EN 10028-3:2003 published by the British Standards Institute in Aug. 2006 (Year: 2006).*
Suzuki, Takashi et al., Rapid Evaluation for Stability of Refrigerants Including 2,3,3,3-tetrafluoropropylene by Using Closed Circulation System, Trans. Mat. Res. Soc. Japan, 37 [3] 479-482. (Year: 2012).*
ISA/EP, International Search Report and Written Opinion for PCT Patent Application No. PCT/FR2017/050617, dated May 8, 2017.
Honeywell: "Solstice yf Refrigerant (R-1234yf)", Aug. 1, 2014, Retrieved from the Internet: URL:https://www.honeywell-refrigerants.com/americas/?document=solstice-yf-packaging-brochure&download=1 (retrieved on Nov. 9, 2016).
Suzuki, Takashi, et al., "Rapid Evaluation for Stability of Refrigerants Including 2,3,3,3-tetrafluoropropylene by Using Closed Circulation System", Trans. Mat. Rs. Soc. Japan, 2012, pp. 479-482, vol. 37[3].

* cited by examiner

*Primary Examiner* — Lee E Sanderson
(74) *Attorney, Agent, or Firm* — NK Patent Law

(57) ABSTRACT

The invention relates to a container housing a composition comprising tetrafluoropropene. The container is made from metal and includes an inner surface, said inner surface being in contact with the composition and being at least partially covered with a coating containing zinc. Advantageously, the aforementioned composition comprises at least 15 wt.-% tetrafluoropropene relative to the total weight of the composition.

13 Claims, No Drawings

CONTAINER FOR STORING A COMPOSITION COMPRISING TETRAFLUOROPROPENE AND METHOD FOR STORING SAME

CROSS REFERENCE TO RELATED APPLICATIONS

This application is a U.S. National Stage application of International Application No. PCT/FR2017/050617 filed on Mar. 17, 2017, which claims the benefit of French Patent Application No. 1652436 filed on Mar. 22, 2016, the entire content of all of which is incorporated by reference herein.

TECHNICAL FIELD

The present invention relates to a method for storing a composition comprising tetrafluoropropene. The present invention also relates to a container for storing a composition comprising tetrafluoropropene. In particular, the present invention relates to a container and to a method for stably storing a composition comprising tetrafluoropropene.

TECHNOLOGICAL BACKGROUND OF THE INVENTION

Over the past few years, 2,3,3,3-tetrafluoropropene ($CF_3CF$=$CH_2$, hereinafter also referred to as HFO-1234yf) has attracted attention as a new refrigerant for replacing refrigerants such as, for example, chlorofluorocarbons (CFCs), hydrochlorofluorocarbons (HCFCs) or hydrofluorocarbons (HFCs), which are greenhouse effect gases. In general, compounds of the hydrochloropropene or hydrofluoropropene type can be unstable and can generate the formation of coproducts in the presence of water, of acid or of oxygen. A method for stabilizing 1,1,2,3-tetrachloropropene in the presence of morpholine or a derivative thereof or of trialkyl phosphate is known in particular from U.S. Pat. No. 9,228,128.

HFO-1234yf is for its part generally stored in the gas state and/or in the liquid state and transported in a pressurized closed container. Under certain conditions, HFO-1234yf can degrade and/or polymerize in the presence of oxygen. US 2015/0051426 describes in particular the storage of HFO-1234yf in a container in which the oxygen concentration is maintained below 1000 ppm by volume in order to prevent degradation thereof and polymerization thereof.

The presence of solid deposits associated with the degradation of HFO-1234yf during storage thereof or transportation thereof can prevent the subsequent use thereof as a refrigerant. In addition, in the event of the presence of a stabilizer in the composition, it is necessary to remove the stabilizer before using the HFO-1234yf, which makes the use thereof more complex and increases the risks linked to the residual presence of the stabilizer.

There is therefore a need for the implementation of a storage method which makes it possible to avoid the drawbacks of the known methods.

SUMMARY OF THE INVENTION

According to a first aspect, the invention provides a container containing a composition comprising tetrafluoropropene, said container being made from metal and comprising an inner surface, said inner surface in contact with said composition being at least partially covered with a coating comprising zinc; advantageously, said composition comprises at least 15% by weight of tetrafluoropropene relative to the total weight of the composition.

According to one preferred embodiment, at least 90% of said inner surface in contact with said composition is covered with a coating comprising zinc, advantageously at least 95% of said inner surface in contact with said composition is covered with a coating comprising zinc, preferably at least 98% of said inner surface in contact with said composition is covered with a coating comprising zinc, in particular at least 99% of said inner surface in contact with said composition is covered with a coating comprising zinc. More particularly, the entire inner surface of the container in contact with said composition may be covered with a coating comprising zinc.

According to one preferred embodiment, the container is made from steel.

According to one preferred embodiment, the container is made from carbon steel.

According to one preferred embodiment, the coating comprises at least 50% by weight of zinc relative to the total weight of the coating, advantageously at least 70% by weight of zinc relative to the total weight of the coating, preferably at least 90% by weight of zinc relative to the total weight of the coating, more preferentially at least 95% by weight of zinc relative to the total weight of the coating, in particular at least 99% of zinc relative to the total weight of the coating, more particularly at least 99.9% of zinc relative to the total weight of the coating.

According to one preferred embodiment, the composition comprises less than 10 000 ppm by weight of water relative to the total weight of the composition, advantageously less than 5000 ppm by weight of water relative to the total weight of the composition, preferably less than 1000 ppm by weight of water relative to the total weight of the composition, in particular from 0.1 ppm to 100 ppm by weight of water relative to the total weight of the composition, more particularly from 1 to 20 ppm by weight of water relative to the total weight of the composition.

According to one preferred embodiment, the composition has an acid content, calculated in hydrochloric acid equivalent, of less than 100 ppm by weight relative to the total weight of the composition, advantageously less than 50 ppm by weight relative to the total weight of the composition, preferably less than 10 ppm by weight relative to the total weight of the composition, in particular from 0.01 ppm to 2 ppm by weight relative to the total weight of the composition.

According to one preferred embodiment, the composition is made up of a gas phase and a liquid phase.

According to one preferred embodiment, the composition comprises a gaseous air content of from 0.1% to 5% by volume relative to the total volume of the gas phase, advantageously from 0.5% to 3% by volume relative to the total volume of the gas phase, preferably from 0.01% to 2% by volume relative to the total volume of the gas phase.

According to one preferred embodiment, the composition comprises at least 90% by weight of tetrafluoropropene relative to the total weight of the composition, advantageously at least 95% by weight relative to the total weight of the composition, preferably at least 98% by weight relative to the total weight of the composition, in particular at least 99.5% by weight relative to the total weight of the composition.

According to one preferred embodiment, the tetrafluoropropene is 2,3,3,3-tetrafluoropropene or 1,3,3,3-tetrafluoropropene.

According to one preferred embodiment, the container is a closed container which withstands a test pressure, said test pressure being between 10 and 100 bar, advantageously between 15 and 70 bar, preferably between 20 and 60 bar, in particular from 40 to 50 bar.

According to one preferred embodiment, said container is cylindrical in shape and is mounted within a steel framework, said framework adhering to the dimensions of iso containers according to the standards ISO 1496-1:2013.

According to a second aspect, the invention provides a method for storing a composition comprising tetrafluoropropene, said method comprising the provision of a metal container, the inner surface of which is at least partially covered with a coating comprising zinc; and the filling of said container with a composition comprising tetrafluoropropene. Advantageously, the composition comprises at least 15% by weight of tetrafluoropropene relative to the total weight of the composition.

According to one preferred embodiment, the inner surface intended to be in contact with said composition comprising tetrafluoropropene is at least partially covered with a coating comprising zinc.

According to one preferred embodiment, the container is made from carbon steel and the coating comprises at least 99.9% by weight of zinc, and the tetrafluoropropene is advantageously 2,3,3,3-tetrafluoropropene or 1,3,3,3-tetrafluoropropene.

According to another aspect of the present invention, a device for loading an air-conditioning or refrigeration circuit or for replacing a refrigerant mixture contained in an air-conditioning or refrigeration circuit is provided. Said device comprises a first container according to the present invention and a second container comprising a lubricant; advantageously, said device also comprises one or more pipes capable of linking said first and second containers to the air-conditioning or refrigeration circuit; preferably, the air-conditioning circuit is an air-conditioning circuit of a vehicle.

DETAILED DESCRIPTION OF THE INVENTION

According to a first aspect of the invention, a container is provided. The container may be of any shape; however, the container is preferably cylindrical. The container comprises an inner surface. Preferably, the container contains a composition comprising tetrafluoropropene. Said container is preferably made from metal. The container may optionally be compartmentalized, for example for containing, in each of the compartments, compositions comprising various amounts of tetrafluoropropene, or for containing for example, in one compartment, a composition comprising tetrafluoropropene and, in another compartment, another compound, for example a lubricant or another fluorinated compound such as a hydrofluorocarbon, a hydrochlorofluorocarbon or a hydrochlorocarbon.

The container can be suitable for transporting a composition comprising tetrafluoropropene and/or for storing a composition comprising tetrafluoropropene. The latter may for example be derived from a production unit for 2,3,3,3-tetrafluoropropene or for 1,3,3,3-tetrafluoropropene.

The container may be equipped with one or more valves for filling and/or emptying said container. For example, an inlet valve can be positioned so that the container is supplied with a stream containing a composition comprising tetrafluoropropene. The container may also be equipped with one or more outlet valves for emptying from said container the composition contained therein. For example, the composition may be emptied from the container in order to supply a device for purifying the composition comprising tetrafluoropropene or for supplying a second container according to the present invention and suitable for transporting a composition comprising tetrafluoropropene. The composition can also be emptied from the container in order to supply an air-conditioning circuit. Thus, the container according to the present invention may be a storage tank for storing a composition comprising tetrafluoropropene or a container which meets the ISO transportation standards. Said container is preferably a pressure-resistant closed container. The container may be cylinder or a cartridge or a small container which is pressure-resistant, the volume of which may preferably be less than 1 $m^3$, advantageously less than 0.1 $m^3$, preferably less than 0.01 $m^3$. Alternatively, the container may be a storage or transportation tank, the volume of which may be greater than 0.5 $m^3$, advantageously greater than 100 $m^3$, preferably greater than 1000 $m^3$, in particular greater than 5000 $m^3$. The storage or transportation tank may preferably be spherical or cylindrical in shape. The container according to the present invention may comprise a thermally insulating wall.

Preferably, said inner surface of the container in contact with said composition comprising tetrafluoropropene is at least partially covered with a coating comprising zinc.

According to one preferred embodiment, at least 90% of said inner surface in contact with said composition may be covered with a coating comprising zinc, advantageously at least 95% of said inner surface in contact with said composition may be covered with a coating comprising zinc, preferably at least 98% of said inner surface in contact with said composition may be covered with a coating comprising zinc, in particular at least 99% of said inner surface in contact with said composition may be covered with a coating comprising zinc. More particularly, the entire inner surface in contact with said composition contained in said container may be covered with a coating comprising zinc.

Preferably, the coating comprises at least 50% by weight of zinc relative to the total weight of the coating, advantageously at least 70% by weight relative to the total weight of the coating, preferably at least 90% by weight of zinc relative to the total weight of the coating, more preferentially at least 95% by weight of zinc relative to the total weight of the coating, in particular at least 99% of zinc relative to the total weight of the coating, more particularly at least 99.9% of zinc relative to the total weight of the coating.

Alternatively, the coating may be an alloy comprising zinc, preferably less than 50% by weight of zinc relative to the total weight of the coating. For example, the coating may be made of brass. Alternatively, the coating may comprise copper, advantageously at least 60% by weight of copper relative to the total weight of the coating, preferably at least 70% by weight of copper relative to the total weight of the coating, in particular at least 90% by weight of copper relative to the total weight of the coating. Alternatively, the container as described in the present application may also have an inner surface, preferably the entire inner surface in contact with said composition, covered with a coating comprising copper or brass as a replacement for zinc.

According to one particular embodiment, at least 90% of said inner surface in contact with said composition may be covered with a coating comprising at least 50% by weight of zinc relative to the total weight of the coating, advantageously at least 70% by weight of zinc relative to the total weight of the coating, preferably at least 90% by weight of zinc relative to the total weight of the coating, more preferentially at least 95% by weight of zinc relative to the total weight of the coating, in particular at least 99% of zinc relative to the total weight of the coating, more particularly at least 99.9% of zinc relative to the total weight of the coating.

According to one particularly advantageous embodiment, at least 95% of said inner surface in contact with said composition may be covered with a coating comprising at least 50% by weight of zinc relative to the total weight of the coating, advantageously at least 70% by weight of zinc relative to the total weight of the coating, preferably at least 90% by weight of zinc relative to the total weight of the coating, more preferentially at least 95% by weight of zinc relative to the total weight of the coating, in particular at least 99% of zinc relative to the total weight of the coating, more particularly at least 99.9% of zinc relative to the total weight of the coating.

According to one particularly preferred embodiment, at least 98% of said inner surface in contact with said composition may be covered with a coating comprising at least 50% by weight of zinc relative to the total weight of the coating, advantageously at least 70% by weight of zinc relative to the total weight of the coating, preferably at least 90% by weight of zinc relative to the total weight of the coating, more preferentially at least 95% by weight of zinc relative to the total weight of the coating, in particular at least 99% of zinc relative to the total weight of the coating, more particularly at least 99.9% of zinc relative to the total weight of the coating.

According to one particularly preferred embodiment, at least 99% of said inner surface in contact with said composition may be covered with a coating comprising at least 50% by weight of zinc relative to the total weight of the coating, advantageously at least 70% by weight of zinc relative to the total weight of the coating, preferably at least 90% by weight of zinc relative to the total weight of the coating, more preferentially at least 95% by weight of zinc relative to the total weight of the coating, in particular at least 99% of zinc relative to the total weight of the coating, more particularly at least 99.9% of zinc relative to the total weight of the coating.

More particularly, the entire inner surface of said container in contact with said composition contained in said container is entirely covered with a coating comprising at least 50% by weight of zinc relative to the total weight of the coating, advantageously at least 70% by weight of zinc relative to the total weight of the coating, preferably at least 90% by weight of zinc relative to the total weight of the coating, more preferentially at least 95% by weight of zinc relative to the total weight of the coating, in particular at least 99% of zinc relative to the total weight of the coating, more particularly at least 99.9% of zinc relative to the total weight of the coating. This makes it possible to minimize the contacts between said composition and the steel. This is because prolonged contact between the composition comprising tetrafluoropropene and the steel, in particular the iron contained in the steel, can promote the formation of hydrogen, in particular if the composition comprises water or hydrochloric acid.

According to one preferred embodiment, the container may be made from steel. Advantageously, the container is made from carbon steel or from stainless steel. Preferably, the container is made from carbon steel. Alternatively, the container may be made from zinc. Alternatively, the container may be made from copper or from brass.

Advantageously, said composition comprises at least 15% by weight of tetrafluoropropene relative to the total weight of the composition. Preferably, said composition comprises at least 40% by weight of tetrafluoropropene relative to the total weight of the composition, more preferentially at least 60% by weight of tetrafluoropropene relative to the total weight of the composition, in particular at least 70% by weight of tetrafluoropropene relative to the total weight of the composition, more particularly at least 80% by weight of tetrafluoropropene relative to the total weight of the composition.

According to one particular embodiment, said composition may comprise at least 90% by weight of tetrafluoropropene relative to the total weight of the composition, advantageously at least 95% by weight relative to the total weight of the composition, preferably at least 98% by weight relative to the total weight of the composition, in particular at least 99.5% by weight relative to the total weight of the composition.

Preferably, the tetrafluoropropene may be 2,3,3,3-tetrafluoropropene and/or 1,3,3,3-tetrafluoropropene.

Thus, said composition may comprise at least 15% by weight of 2,3,3,3-tetrafluoropropene relative to the total weight of the composition. Preferably, said composition comprises at least 40% by weight of 2,3,3,3-tetrafluoropropene relative to the total weight of the composition, more preferentially at least 60% by weight of 2,3,3,3-tetrafluoropropene relative to the total weight of the composition, in particular at least 70% by weight of 2,3,3,3-tetrafluoropropene relative to the total weight of the composition, more particularly at least 80% by weight of 2,3,3,3-tetrafluoropropene relative to the total weight of the composition. According to one particular embodiment, said composition may comprise at least 90% by weight of 2,3,3,3-tetrafluoropropene relative to the total weight of the composition, advantageously at least 95% by weight of 2,3,3,3-tetrafluoropropene relative to the total weight of the composition, preferably at least 98% by weight of 2,3,3,3-tetrafluoropropene relative to the total weight of the composition, in particular at least 99.5% by weight of 2,3,3,3-tetrafluoropropene relative to the total weight of the composition.

Alternatively, said composition may comprise at least 15% by weight of 1,3,3,3-tetrafluoropropene relative to the total weight of the composition. Preferably, said composition comprises at least 40% by weight of 1,3,3,3-tetrafluoropropene relative to the total weight of the composition, more preferentially at least 60% by weight of 1,3,3,3-tetrafluoropropene relative to the total weight of the composition, in particular at least 70% by weight of 1,3,3,3-tetrafluoropropene relative to the total weight of the composition, more particularly at least 80% by weight of 1,3,3,3-tetrafluoropropene relative to the total weight of the composition. According to one particular embodiment, said composition may comprise at least 90% by weight of 1,3,3,3-tetrafluoropropene relative to the total weight of the composition, advantageously at least 95% by weight of 1,3,3,3-tetrafluoropropene relative to the total weight of the composition, preferably at least 98% by weight of 1,3,3,3-tetrafluoropropene relative to the total weight of the composition, in particular at least 99.5% by weight of 1,3,3,3-tetrafluoropropene relative to the total weight of the composition.

Said composition contained in the container may comprise less than 10 000 ppm by weight of water relative to the total weight of the composition, advantageously less than 5000 ppm by weight of water relative to the total weight of the composition, preferably less than 1000 ppm by weight of water relative to the total weight of the composition, more preferentially less than 500 ppm by weight of water relative to the total weight of the composition, in particular less than 100 ppm by weight of water relative to the total weight of the composition, more particularly less than 50 ppm by weight relative to the total weight of the composition.

Advantageously, said composition may comprise from 0.01 to 500 ppm by weight of water relative to the total weight of the composition, preferably from 0.05 to 250 ppm by weight of water relative to the total weight of the composition, in particular from 0.1 to 100 ppm by weight of water relative to the total weight of the composition, more particularly from 1 to 20 ppm of water relative to the total weight of the composition.

According to one preferred embodiment, said composition may comprise a gaseous air content of from 0.1% to 5% by volume relative to the total volume of the gas phase, advantageously from 0.5% to 3%, preferably from 0.01% to 2% by volume relative to the total volume of the gas phase.

Preferably, said composition may comprise less than 10 000 ppm by weight of water relative to the total weight of the composition, advantageously less than 5000 ppm by weight of water relative to the total weight of the composition, preferably less than 1000 ppm by weight of water relative to the total weight of the composition, more preferentially less than 500 ppm by weight of water relative to the total weight of the composition, in particular less than 100 ppm by weight of water relative to the total weight of the composition, more particularly less than 50 ppm by weight of water relative to the total weight of the composition; and a gaseous air content of from 0.1% to 5% by volume relative to the total volume of the gas phase, advantageously from 0.5% to 3% by volume relative to the total volume of the gas phase, preferably from 0.01% to 2% by volume relative to the total volume of the gas phase.

In particular, said composition may comprise from 0.01 to 500 ppm by weight of water relative to the total weight of the composition, preferably from 0.05 to 250 ppm by weight of water relative to the total weight of the composition, in particular from 0.1 ppm to 100 ppm by weight of water relative to the total weight of the composition, more particularly from 1 to 20 ppm by weight of water relative to the total weight of the composition; and a gaseous air content of from 0.1% to 5% by volume relative to the total volume of the gas phase, advantageously from 0.5% to 3% by volume relative to the total volume of the gas phase, preferably from 0.01% to 2% by volume relative to the total volume of the gas phase.

According to one preferred embodiment, the composition may have an acid content, calculated in hydrochloric acid equivalent, of less than 100 ppm by weight of acid relative to the total weight of the composition, advantageously less than 50 ppm by weight of acid relative to the total weight of the composition, preferably less than 10 ppm by weight of acid relative to the total weight of the composition, in particular from 0.01 ppm to 2 ppm by weight of acid relative to the total weight of the composition.

Advantageously, said composition may have an acid content, calculated in hydrochloric acid equivalent, of less than 100 ppm by weight relative to the total weight of the composition, advantageously less than 50 ppm by weight relative to the total weight of the composition, preferably less than 10 ppm by weight relative to the total weight of the composition, in particular from 0.01 ppm to 2 ppm by weight relative to the total weight of the composition; and may comprise less than 10 000 ppm by weight of water relative to the total weight of the composition, advantageously less than 5000 ppm by weight relative to the total weight of the composition, preferably less than 1000 ppm by weight of water relative to the total weight of the composition, more preferentially less than 500 ppm by weight of water relative to the total weight of the composition, in particular less than 100 ppm by weight of water relative to the total weight of the composition, more particularly less than 50 ppm by weight of water relative to the total weight of the composition. Alternatively, said composition may have an acid content, calculated in hydrochloric acid equivalent, of less than 100 ppm by weight relative to the total weight of the composition, advantageously less than 50 ppm by weight relative to the total weight of the composition, preferably less than 10 ppm by weight relative to the total weight of the composition, in particular from 0.01 ppm to 2 ppm by weight relative to the total weight of the composition; and may comprise from 0.01 to 500 ppm of water by weight relative to the total weight of the composition, preferably from 0.05 to 250 ppm by weight relative to the total weight of the composition, in particular from 0.1 ppm to 100 ppm by weight relative to the total weight of the composition, more particularly from 1 to 20 ppm by weight relative to the total weight of the composition.

Said composition may have an acid content, calculated in hydrochloric acid equivalent, of less than 100 ppm by weight relative to the total weight of the composition, advantageously less than 50 ppm by weight relative to the total weight of the composition, preferably less than 10 ppm by weight relative to the total weight of the composition, in particular from 0.01 ppm to 2 ppm by weight relative to the total weight of the composition; and a gaseous air content of from 0.1% to 5% by volume relative to the total volume of the gas phase, advantageously from 0.5% to 3% by volume relative to the total volume of the gas phase, preferably from 0.01% to 2% by volume relative to the total volume of the gas phase.

Preferably, said composition may have an acid content, calculated in hydrochloric acid equivalent, of less than 100 ppm by weight relative to the total weight of the composition, advantageously less than 50 ppm by weight relative to the total weight of the composition, preferably less than 10 ppm by weight relative to the total weight of the composition, in particular from 0.01 ppm to 2 ppm by weight relative to the total weight of the composition; and a gaseous air content of from 0.1% to 5% by volume relative to the total volume of the gas phase, advantageously from 0.5% to 3% by volume relative to the total volume of the gas phase, preferably from 0.01% 2% by volume relative to the total volume of the gas phase; and may comprise from 0.01 to 500 ppm by weight of water relative to the total weight of the composition, preferably from 0.05 to 250 ppm by weight of water relative to the total weight of the composition, in particular from 0.1 ppm to 100 ppm by weight of water relative to the total weight of the composition, more particularly from 1 to 20 ppm by weight of water relative to the total weight of the composition.

Preferably, said composition may have an acid content, calculated in hydrochloric acid equivalent, of less than 100 ppm by weight relative to the total weight of the composition, advantageously less than 50 ppm by weight relative to the total weight of the composition, preferably less than 10 ppm by weight relative to the total weight of the composition, in particular from 0.01 ppm to 2 ppm by weight relative to the total weight of the composition; and a gaseous air content of from 0.1% to 5% by volume relative to the total volume of the gas phase, advantageously from 0.5% to 3% by volume relative to the total volume of the gas phase, preferably from 0.01% to 2% by volume relative to the total volume of the gas phase; and may comprise less than 10 000 ppm by weight of water relative to the total weight of the composition, advantageously less than 5000 ppm by weight of water relative to the total weight of the composition, preferably less than 1000 ppm by weight of water relative to the total weight of the composition, more preferentially less than 500 ppm by weight of water relative to the total weight of the composition, in particular less than 100 ppm by weight of water relative to the total weight of the composition, more particularly less than 50 ppm by weight of water relative to the total weight of the composition.

Said container may be a closed container which withstands a test pressure, said test pressure may be between 10 and 100 bar, advantageously between 15 and 70 bar, preferably between 20 and 60 bar, in particular between 40 and 50 bar.

Preferably, when said composition is contained in the container, said composition may be made up of a gas phase and a liquid phase. In particular, the gas phase and the liquid phase can have the same chemical composition, that is to say that the proportion of tetrafluoropropene in the liquid phase and in the gas phase is substantially identical, when said composition comprises at least 95% by weight of tetrafluoropropene, preferably at least 98% by weight of tetrafluoropropene, in particular at least 99.5% by weight of tetrafluoropropene.

According to one preferred embodiment, said container is cylindrical in shape and is mounted within a steel framework, said framework adhering to the dimensions of iso containers according to the standards ISO 1496-1:2013.

According to another preferred embodiment, said container is a cartridge which withstands said test pressure mentioned above. Preferably, the internal volume of the cartridge containing a composition comprising 2,3,3,3-tetrafluoropropene or 1,3,3,3-tetrafluoropropene is less than 1 $m^3$, advantageously less than 0.1 $m^3$, preferably less than 0.01 $m^3$.

According to a second aspect, the invention provides a method for storing a composition comprising tetrafluoropropene, said method comprising the provision of a metal container, the inner surface of which is at least partially covered with a coating comprising zinc; and the filling of said container with a composition comprising tetrafluoropropene. The container and the composition are as defined in the first aspect of the present invention.

According to one preferred embodiment, the container is made from carbon steel and the coating comprises at least 99.9% by weight of zinc relative to the total weight of the coating, and advantageously the tetrafluoropropene is 2,3,3,3-tetrafluoropropene and/or 1,3,3,3-tetrafluoropropene.

According to another aspect of the present invention, a device is provided. Said device comprises a container, preferably a cylinder or cartridge or a small container, according to the present invention, and a second container comprising a lubricant. The device according to the invention can thus be suitable for preparing a refrigerant mixture comprising a lubricant and a composition comprising tetrafluoropropene. The device according to the invention can also be suitable for loading an air-conditioning circuit, preferably an automobile air-conditioning circuit, or a refrigeration circuit. Preferably, the lubricant can be suitable for automobile air conditioning. By way of lubricants, use may in particular be made of polyalkylene glycols, polyol esters and/or polyvinyl ethers. Said device also comprises connectors linking, optionally independently, each of the containers to an air-conditioning or refrigeration container or circuit in which the lubricant of said second container is mixed with said composition comprising tetrafluoropropene contained in said container according to the present invention.

EXAMPLE

Carbon steel coupons totally covered with a coating comprising more than 99.9% of zinc by weight are introduced into sealed glass tubes. An amount of water or of 0.1 N hydrochloric acid is introduced into each tube by weighing. The sealed tube is placed in dry ice in order to facilitate the pulling and the transfer of the refrigerant fluid in said tube. The cylinder containing the refrigerant fluid is connected to the sealed tube, a vacuum is pulled in the entire device and the leaktightness is verified. The fluid is then expanded in a buffer cylinder of known volume. A determined weight of the fluid can thus be introduced into the sealed tube. This weight is calculated as a function of the pressure difference, the temperature and the buffer volume. It is verified using a manometer that the product has indeed been transferred, and the tube is sealed. The tube thus sealed is weighed then placed in a metal sheath, and placed in an incubator at 85° C. for 14 days. In this example, the refrigerant fluid is 2,3,3,3-tetrafluoropropene.

At the end of the 14 days, visual observation of the tubes does not show any change in color of the liquid 2,3,3,3-tetrafluoropropene. The gas phase is also analyzed by chromatography. Table 1 reproduces the results of the analysis for each of the tubes.

TABLE 1

|  | Reference | Tube 1 | Tube 2 |
| --- | --- | --- | --- |
| Metal | — | Galvanized carbon steel | Galvanized carbon steel |
| Weight of HFO-1234yf | — | 4 g | 4 g |
| Weight of water | — | 0.03 g | — |
| Weight of HCl | — | — | 0.03 g |
| Temperature | Ambient | 85° C. | 85° C. |
| Duration | — | 14 days | 14 days |
| Cyclo-hexafluoropropene | 0.0352 | 0.0361 | 0.0358 |
| CFC-115 + ethane | 0.0032 | 0.0032 | 0.0033 |
| HFC-134a | 0.0222 | 0.0245 | 0.0236 |
| HFO-1234yf | 99.8571 | 99.8493 | 99.8488 |
| HFO-1243zf | 0.0772 | 0.082 | 0.0843 |
| Propene + propane | 0.0048 | 0.0045 | 0.004 |
| HFC-254eb | 0.0004 | 0.0004 | 0.0003 |

No major difference between the reference tube and those containing the coupons and the water or the HCl is observed. The contact between the zinc and the HFO-1234yf, whether in the presence of water or HCl, has no effect on the composition thereof. The containers covered with a coating comprising zinc according to the present invention make it possible to stably store a composition comprising tetrafluoropropene.

The galvanized carbon steel coupons also do not exhibit an corrosion. No variation in weight of the coupons is observed.

The invention claimed is:

1. A pressure-resistant, closed storage container configured to transport a refrigeration composition, wherein said container is cylindrical in shape and is mounted within a steel framework, said framework adhering to the dimensions of iso containers according to the standards ISO 1496-1: 2013 and containing a refrigeration composition, said storage container being made from metal and comprising an inner surface, wherein at least a portion of said inner surface is in contact with said composition and wherein said portion in contact with said composition is at least partially covered with a coating comprising zinc; said composition comprising at least 15% by weight of tetrafluoropropene relative to the total weight of the composition.

2. The container of claim 1, wherein at least 90% of said portion of inner surface in contact with said composition is covered with a coating comprising zinc.

3. The container of claim 1, wherein the container is made from steel.

4. The container of claim 3, wherein the container is made from carbon steel.

5. The container of claim 1, wherein said coating comprises at least 50% by weight of zinc relative to a total weight of said coating.

6. The container of claim 1, wherein the composition comprises less than 10,000 ppm by weight of water relative to the total weight of the composition.

7. The container of claim 1, wherein the composition comprises an acid content, calculated in hydrochloric acid equivalent, of less than 100 ppm by weight relative to the total weight of the composition.

8. The container of claim 1, wherein the composition comprises a gas phase and a liquid phase.

9. The container of claim 8, wherein the composition comprises a gaseous air content of from 0.1% to 5% by volume relative to the total volume of the gas phase.

10. The container as claimed in claim 1, wherein the composition comprises at least 90% by weight of tetrafluoropropene relative to the total weight of the composition.

11. The container as claimed in claim 1, wherein the tetrafluoropropene comprises 2,3,3,3-tetrafluoropropene or 1,3,3,3-tetrafluoropropene.

12. The container of claim 1, wherein the container is configured to withstand a test pressure between 10 and 100 bar.

13. A device for loading an air-conditioning or refrigeration circuit or for replacing a refrigerant mixture contained in an air-conditioning or refrigeration circuit, said device comprising a first container as claimed in claim 1 and a second container comprising a lubricant; said device further comprising one or more pipes capable of linking said first and second containers to the air-conditioning or refrigeration circuit.

* * * * *